May 17, 1966 W. E. HUMBERT ETAL 3,251,728
STRANDED ALIPHATIC OLEFIN POLYMER FOAM
FOR LOOSE-FILL PACKAGING
Filed Sept. 10, 1962
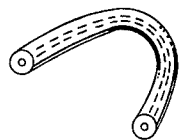
Fig. 1
Fig. 2
Fig. 3
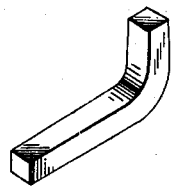
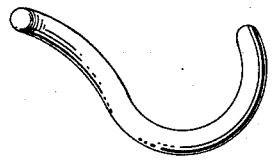
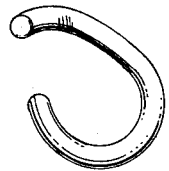
Fig. 4
Fig. 5
Fig. 6
Fig. 7
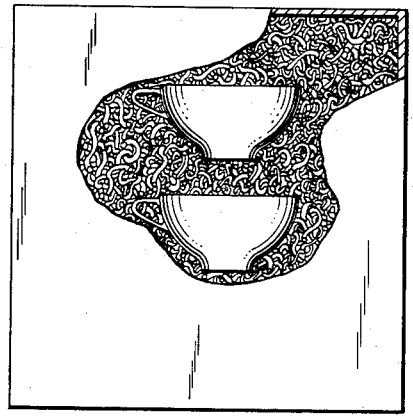
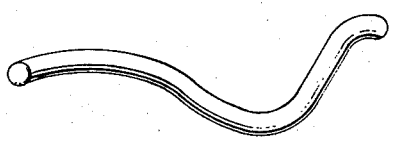
Fig. 8
Fig. 9
INVENTORS.
Maurice L. Zweigle
Wayne E. Humbert
Louis C. Rubens
BY *Griswold & Burdick*
ATTORNEYS

United States Patent Office 3,251,728
Patented May 17, 1966

3,251,728
STRANDED ALIPHATIC OLEFIN POLYMER FOAM
FOR LOOSE-FILL PACKAGING
Wayne E. Humbert, Maurice L. Zweigle, and Louis C.
Rubens, Midland, Mich., assignors to The Dow Chemical Company, Midland, Mich., a corporation of Delaware
Filed Sept. 10, 1962, Ser. No. 222,402
4 Claims. (Cl. 161—168)

This invention relates to the art of packing or packaging articles, objects, and materials of various kinds, which are subject to damage or breakage by shock or impact, with stranded, thermoplastic polymer foam for transportation, preservation, and storage purposes. The invention also relates to a new type of curled or non-linear stranded thermoplastic polymer foam.

There are many classes of objects and materials that require special packing and protection for the purpose of shipping, storing, or for merely preserving the same. They include fragile and easily damaged articles such as electrical, electronic, and X-ray equipment having thin, easily broken glass envelopes, shock sensitive material, such as those containing fulminates, or the like, delicate optical instruments and components, medical and surgical equipment, materials and specimens, valuable and fragile antiques and archeological objects, vibration and shock sensitive mechanisms, and the like. The conventional procedures for packaging or packing such articles and materials comprises the construction of special boxes or crates, the use of soft, yielding packing material, such as excelsior, shredded paper, sawdust, popcorn, shredded plastic foams, and foamed-in-place thermoplastic compositions which are poured in a liquid state around the article to be packaged and subsequently foamed by direct heating, indirect heating, or otherwise.

These known packaging methods and materials are not dusty to handle, subject to attack by chemicals, and absorb water and moisture, but are liable to destruction and infestation by worms and other vermin and are less satisfactory than is desired.

It is a primary object of the invention to provide a new type of synthetic polymer packing or dunnage material which is light in weight with a low bulk density, is resilient and possesses good strength sufficient to support heavy articles without crushing or powdering, and is chemically inert, water and moisture-resistant, dustless, non-toxic, vermin-proof, and buoyant.

Another object is to provide packing means and procedure that inhibits or prevents the article or material being packed from being subject to vibration, shock, or other damaging treatment and does not permit substantial movement or other change in the position of the packed article or the packing material upon handling, tipping, or inverting of the package.

Still another object is to provide a packing material wherein the enclosing sheath of stranded cellular polymeric material is flexible, yielding, and resilient sufficient to cradle and support an object in such a manner that it is well protected against heavy or severe impact, as well as against low amplitude vibration and the like.

A further object is to provide a package that may be readily, deliberately opened without endangering or damaging the enclosed article or object and which dunnage or packing material thereof remains substantially unharmed and can be reused for future packaging.

Other objects and features of the invention will become apparent from the following detailed description of the invention.

The invention comprises supporting an object sensitive to damage by impact, vibration, or shock within a body of cellular, plastic foam, consisting of a tangled mass of curled, bent, curved, or twisted, elongated, individual pieces of a foamed aliphatic olefin polymer, which pieces of cellular foam consist of a substantially continuous outer plastic skin integral with and covering the interior individually-closed, thin-walled portions of the cellular foam pieces which are composed for the most part of individually-closed, thin-walled cells suitably of size of 1.0 millimeter or less in diameter.

The invention is described more particularly with reference to the accompanying drawing wherein:
FIGURES 1-8, inclusive, are diagrammatic sketches showing various forms of the elongated foam plastic material, and
FIGURE 9 is a diagrammatic sketch partly in section showing two fragile articles packaged within a body or mass of the tangled elongated foamed polymer packaging material contained in a paper carton or box.

In the drawing, FIGURES 1-8, inclusive show various of the curled, twisted, or curved forms of the elongated pieces of the foamed polymer packaging material, such as pieces of round, oval, square, rectangular, or thick-walled, tubular cross section, and having a substantially continuous outer skin covering and protecting the inner cellular portions of the foam.

FIGURE 1 shows the end or cross section of a piece of the elongated foam packaging material when such elongated piece is cut and showing the severed cells thereof.

Thus, the foamed polymer strands, segments, or elongated pieces can be of circular, square, rectangular, elliptical, semi-circular, or other cross section and of a length such that the ratio of length to cross-sectional area is at least 100:1.

In general, the pieces or segments of the foamed polymer packaging material can have a cross-sectional area equivalent to that of a circle having a diameter of from about 0.04 to 1.0 inch and are correspondingly of a length of from about 4.0 to 20 inches long, although longer individual pieces or segments can be used. The interlocking ability of the foamed segments of the instant polyolefins which exceed 0.4 inch in cross-sectional area and have a linear dimension of up to about 10 inches or more may optionally be improved by subjecting the foamed rods after solidification to a stretching and a hot quenching operation whereby permanent waves or crimps are formed in the substantially continuous outer plastic skin that covers the interior, individually-closed, thin-walled portions of the cellular foam segments.

FIGURE 9 of the drawing is self-explanatory and shows a container 10 which can be a paper box carton, wood, or metal container within which two fragile objects, such as a china teacup indicated by the numerals 11 and 11a, are packed or cushioned in a tangled mass or body of the foamed polymer segments 12. The fragile articles 11 and 11a are positioned or supported within the mass of the foamed polymer segments 12 so that the packing material completely fills and surrounds the articles and protects them from damage by impact or shock both from without and from within. Two or more fragile objects can be packaged in a single container in the manner just described.

The foamed polymer packing material can be in the form of elongated pieces, such as segments of strands, rods, bars, tapes, tubes, and the like. The individual pieces or segments of the foamed polymers can have an absolute density between about 0.5 and 5 pounds per cubic foot, and as previously mentioned, are of curled, bent, curved, twisted, or other nonlinear configuration such that, when poured or heaped into a mass or body, the segments form a tangled mass having a bulk density of from 0.25 to about 2 pounds per cubic foot of the segments, the tangled segments being intertwined so as to press or bind against one another upon application of pressure and form a resilient yielding mass which cradles objects packaged therein and prevents damage by impact or shock from without.

The foamable, thermoplastic polymers applicable in the production of the non-linear, elongated, individual, cellular pieces of the invention are the resinous aliphatic olefin polymers containing a volatile foaming agent uniformly distributed throughout.

The aliphatic olefin polymers to be employed in making the cellular products of the invention can be normally solid polymers obtained by polymerizing at least one α-monoolefinic aliphatic hydrocarbon containing from 2 to 8 carbon atoms, such as ethylene, propylene, butene-1, pentene-1, 3-methylbutene-1, 4-methylpentene-1, 4-methylhexene-1, or 5-methylhexene-1, alone, with one another, or with various other polymerizable compounds, but the polymers of ethylene or propylene alone are preferred because they produce tough resilient and fine-celled chemically inert products. Examples of suitable polymerizable organic compounds which can be polymerized with ethylene or propylene are vinyl acetate, $C_1$–$C_4$ alkyl acrylates, such as ethyl acrylate, styrene, lower alkyl esters of methacrylic acid, such as methyl methacrylate, tetrafluoroethylene and acrylonitrile. Copolymers containing in chemically combined form a predominant amount, e.g., 75 percent by weight or more, of ethylene or propylene with not more than 25 percent of one or more of such other polymerizable compounds can be used. The aliphatic olefin polymers can be modified by blending with polymeric materials, e.g., polyisobutylene acrylonitrile-butadiene rubbers, poly(2-chlorobutadiene-1,3), polyisoprene, or ethylene-vinylacetate copolymers. Halogenated aliphatic olefin polymers can also be used.

The foaming agents employed in the preparation of the cellular dunnage materials of the invention are usually normally gaseous or volatile liquids. A wide variety of suitable foaming agents have been disclosed in the art. Nitrogen has been mentioned as one form of elemental gas that might be used to produce the instant cellular materials. In place of nitrogen, other normally gaseous elements, compounds, or mixtures thereof may be used as the agent to produce cellular plastic products. Among the other elemental gases that might be employed with satisfactory results are argon, neon, and helium.

Other normal, gaseous, organic compounds that may be employed are acetylene, ammonia, butadiene, butane, butene, carbon dioxide, cyclopropane, dimethylamine, 2,2-dimethylpropane, ethane, ethylamine, ethylene, isobutane, isobutylene, monomethylamine, propane, propylene, and trimethylamine.

In addition, normally gaseous, organic compounds may be used to expand the plastic material. Among the most important of these are certain of the halogen derivatives of methane and ethane, such as chlorodifluoromethane, dichlorodifluoromethane, dichlorofluoromethane, trichlorofluoromethane, difluorotetrachloroethane, difluorochloroethane, 1,1-difluoroethane, trichlorofluoromethane, and particularly 1,1-dichlorotetrafluoroethane and 1,2-dichlorotetrafluoroethane.

The dichlorotetrafluoroethanes have been found to be a particularly effective foaming agent for making cellular bodies from normally solid aliphatic olefin polymers, which cellular bodies are composed of uniform small cells.

The foaming agent can be employed in amount corresponding to from 0.05 to about 0.5, preferably from 0.05 to about 0.15, gram mole of the dichlorotetrafluoroethane per 100 grams of the aliphatic olefin polymer.

The non-linear, curled, bent, or twisted, elongated, individual pieces of the thermoplastic, foamable polymer can be produced by known extrusion methods whereby the thermoplastic polymer or copolymer material in a solid or granular form is heated at a temperature above the fusion or softening temperature of the copolymer while continuously mixing the same in a suitable mixing device, such as is included as part of commercially available enclosed thermoplastic blender-extruder equipment until a uniform, homogeneous, flowable mass is obtained. Thereafter, the heated and blended mass may be extruded into various forms, such as strings, rods, tubes, etc., cooled and cut into length by means of a conventional type extruder and cutter system. Alternatively, the extruded material can be cut into segments and allowed to foam to a cellular body.

In practice, the cellular aliphatic olefin polymer bodies are prepared by placing the molten polymer under pressure of a gaseous blowing agent (e.g., a halogen derivative of methane and ethane), such as by heating the materials in admixture with one another in a pressure resistant vessel at temperatures between about 90° and 200° C., suitably at a temperature at least as high as the melting point of the polymer, until a uniform or substantially uniform flowable gel is obtained. Thereafter, the gel is extruded into a zone of sufficiently lower pressure to cause the extruded material to expand with resultant formation of a cellular polymer body. The process can be carried out batchwise or in continuous manner.

The gel is preferably extruded at a temperature near or above the melting point of the olefin polymer, but higher or lower temperatures can be used. The temperature at which the gel is extruded into a zone of lower pressure will vary depending in part upon the size and arrangement of the apparatus employed, the rate of extrusion of the gel, the melting point of the olefin polymer and the proportions of the polymer and the gaseous blowing agent employed.

In general, the gel can be extruded at a temperature of from about 25° C. below the temperature at which crystallization of the olefin polymer causes an observable cloudiness of the gel to a temperature of 25° C. or higher above the melting point of the polymer. The temperature at which crystallization of the olefin polymer causes a cloudiness of the gel can readily be determined by sealing weighed amounts of the polymer, e.g., polyethylene, and dichlorotetrafluoroethane in a glass tube, heating the mixture to a temperature above the melting point of the polymer to obtain a transparent uniform gel, then cooling or allowing the gel to cool and observing the temperature at which the gel becomes hazy or cloudy. The temperature at which an observable cloudiness of the gel occurs is herein referred to as the "cloud point."

In a preferred practice for making the utile cellular aliphatic olefin polymer products in a continuous manner, the normally solid polymer, e.g., polyethylene, polypropylene and copolymers thereof containing up to 25 weight percent of at least one other polymerizable material, as described heretofore, suitably in granular form, is fed to a plastics extruder wherein it is heat-plastified and blended with the volatile gaseous blowing agent, preferably a dichlorotetrafluoroethane, under pressure in the desired proportion to form a homogeneous flowable composition, which composition is brought to a substantially uniform temperature between about 90° and 200° C. throughout its mass and is thereafter extruded or discharged through a suitable orifice into a zone of lower pressure, e.g., the atmosphere, wherein the extruded material expands to form a cellular body, which cellular body is cooled and cut into pieces suitable for employment as the new packing or dunnage material of the invention.

The above-mentioned preferred method is described in detail in copending application for United States Letters Patent having Serial No. 680,654 which was filed August 28, 1957, now U.S. Patent No. 3,067,147, by Louis C. Rubens, John D. Griffin and Demetrius Urchick.

The flowable gel of the aliphatic olefin polymer and the dichlorotetrafluoroethane blowing agent under pressure is preferably extruded at a temperature approximately the same as, e.g., within 25° C. higher or lower than, the cloud point of the gel, into a zone of lower pressure.

This process provides a suitable and economical method for making cellular masses from aliphatic olefin polymers which cellular material consists of a tangled mass of curled, bent, curved or twisted, elongated, individual pieces of a foamed aliphatic olefin polymer. The products possess a highly uniform fine cell structure having a substantially continuous outer plastic skin integral with and covering the interior portions of the cellular foam pieces consisting for the most part of thin-walled, individually-closed cells. The foam segmented dunnage materials of the invention are flexible, resilient, tough, chemically inert materials.

Finely divided solid materials, such as calcium silicate, zinc stearate, magnesium stearate, and the like can advantageously be incorporated with the polymer or gel prior to expanding the same. Such finely divided materials aid in controlling the size of the cells, and are employed in amounts of about 0.4 percent by weight of the polymer.

The novel foam, segmented dunnage material of the present invention may also be produced by means of the method of making cellular polyethylene as patented in United States Letters Patent 2,948,664 that issued to Louis C. Rubens and Demetrius Urchick on August 9, 1960. According to the patented method, pellicles of ethylene polymer are subjected to ionizing radiations in amount sufficient to cause the polymer to be insoluble in boiling decalin and insufficient to prevent appreciable flow of the polymer at temperatures above its crystalline melting point, e.g., at temperatures betwen 100° and 200° C., suitably ionizing radiations corresponding to a dosage of from about 2 to 20 megareps per square centimeter, depending in part upon the molecular weight of the polyethylene initially used. Thereafter, the so-treated polyethylene is placed under pressure of a normally gaseous agent soluble therein until the gaseous agent is uniformly or substantially uniformly dispersed throughout the irradiated material and suddenly releasing the pressure by an amount at least sufficient to cause the dissolved gaseous agent to expand the heated polymer with resultant formation of one or a multiplicity of cellular polyethylene bodies depending on the type of extrusion orifice employed.

In packaging, the article or object to be packaged should be positioned, preferably centered, in a suitable size outer container, such as a paper carton, wooden box, or steel drum, initially provided with a bottom layer of the tangled, interlocking, cellular pieces described above. It will be recognized that for any single packing application it is not required that all of the individual pieces of the novel, curled, bent, curved or twisted, elongated aliphatic olefin polymer foam of the invention have the same cross-sectional and linear dimensions. Frequently, highly satisfactory results can be attained by using a mixture of the novel foamed segments that includes a diversity of sizes. Thereafter, an additional quantity of the cellular pieces may be introduced in such a manner as to completely fill the outer container and support the article therein against substantial movement. Finally, the outer container is closed and the cover securely fastened, in a conventional manner appropriate to the type of outer container employed, so as to complete the packaging.

A highly satisfactory method of producing and procedures for using the new packing material of the invention will be described in greater detail in the following examples and the advantages of the invention will be better understood from a consideration of the following experimental data which are intended for purposes of illustration and are not regarded as limitations to the appended claims.

Example I

Polyethylene having a melt index of 2, together with 1.5 percent by weight of zinc stearate, was fed in the form of solid granules into a plastics extruder at a rate corresponding to 30 pounds of the mixture per hour. The plastics extruder employed in the experiment comprised a four foot long barrel having a 2½ inch diameter screw equipped with a mixing head similar in design to that described in U.S. Patent No. 2,453,088, and a sealing plate positioned midway of the screw. An inlet to the barrel of the extruder was provided adjacent to the sealing plate for feed of a volatile organic compound as blowing agent into the barrel and into contact with the heat-plastified polyethylene. The sealing plate formed a constricted passageway between the rim of the plate and the bore of the barrel so that flow of the heat-plastified polyethylene through the constricted passageway by pressure of the flights of the screw formed an effective plastic seal against countercurrent flow or leakage of the volatile organic compound from the extruder. The heat-plastified polyethylene was forwarded under pressure of the screw around the sealing plate and into the second section of the barrel of the extruder wherein it was mixed with dichlorotetrafluoroethane fed thereto at a rate of 7.5 pounds per hour. The resulting mixture was blended under pressure, principally by action of the mixing head on the screw of the extruder, into a uniform composition and was brought to a temperature between 98° and 102° C. then forced through a multiple discharge orifice having 7 outlet ports, each port having a cross-sectional dimension of 0.0156 inch inside diameter into the atmosphere. The extruded material was allowed to expand freely in the air and each non-linear extruded segment expanded to about 5 times the size of the initially extruded segment. The product was a cellular body of about 0.08 inch cros section and was composed of substantially uniform fine cells, a smooth continuous surface surrounding and enclosing the exterior of each foamed segment. The product had a bulk density of about 0.34 pound per cubic foot of the cellular mass.

Example II

To demonstrate the substantially superior cushioning properties of non-linear, stranded, polyethylene foam as compared with usual cushioning material, e.g., excelsior, currently employed for packing purposes, the following tests were performed. Several medium, utility grade porcelain teacups, each weighing approximately 160 grams (as are commonly used in the home for everyday use), were chosen as test articles. This type of article was selected because the slightest breakage or damage is readily discernible upon examination. In addition, this type of earthenware is currently being shipped in a standard cushioning packing material (i.e., shredded paper, excelsior, sawdust, etc.). These tests were conducted to demonstrate the highly satisfactory cushioning protection afforded by the novel, non-linear, stranded, polyethylene foamed dunnage material of the invention. Several identical corrugated paper shipping cartons having inside dimensions of 5¼ in. by 6⅝ in. by 10⅞ in. and having a volumetric capacity of about 379 cubic inches were selected to confine mass of the stranded foam packing material around the articles to be protected. In the bottom of the carton was arranged a 2 inch cushioning layer of polyethylene foam strands of Example I having the dimensions of about 0.08 inch cross-sectional diameter by from about 8 to about 10 inches in length and in the form of curled, bent, curved, intertangling segments having a bulk density of 0.34 pound per cubic foot of the mass of segments. Next, in each of the cartons, there were positioned two medium, utility-grade, porcelain teacups as described previously. Two of the teacups were packaged in each carton to simulate internal contact as well as impact from the outside. The non-linear polyethylene foam strands were poured around and over the teacups in such a manner as to provide at least a one inch bumpering mass of the instant strands between the porcelain articles as well as on all sides of said articles. The packing of the cartons was completed by adding approximately a 2 inch layer of the strands over and on top of each pair of teacups. The entire protective dunnage layer was sufficient to provide a snug, compact fit between the packaged articles and the dunnage material and prevent substantial movement of the articles when the top flaps of the carton were folded and taped shut in the conventional way used to close corrugated paper shipping cartons.

Each box, in turn, was secured to the table of a sieve shaking machine and vibrated for about 30 minutes in a horizontal plane at an average rate of about 255 cycles per minute. Upon opening each box after completion of each of the vibration tests, it was observed that there appeared to be little if any significant change in the position of any of the vibration-shaken packaged cups. The results of these vibration tests indicate that the new, non-linear, polyethylene foam strands of the invention, as described heretofore, provided highly satisfactory cushioning of each pair of packaged teacups sufficient to prevent chipping, cracking, or any degree of breakage by force of internal impact as well as by force of impact by external vibration. Of additional benefit, the resilient mass of curled, bent, curved, intertangled, segmented polyethylene foam strands were not crushed, powdered, broken, or deformed in any way to an extent which would generally permit potentially hazardous shifting of the packaged items.

*Example III*

Employing the following apparatus, equipment, procedure and starting materials, a substantial quantity of the new, non-linear, stranded, thermoplastic, foamed polyolefin loose-fill packaging material of the present invention was prepared by means of the following batch method.

The reactor was a metal tube of suitable capacity provided with a sealing means at the bottom consisting of a frangible disc constructed of annealed nickel and capable of bursting under an applied pressure of between about 750 and 800 p.s.i.g. The frangible disc bottom sealing means was held securely in position by means of a metal washer and an adaptor fitting. The reactor was subsequently tester for leaks by purging the sealed reactor with nitrogen gas at a pressure of 600 p.s.i.g. and was found to be leak-proof. Thereafter, the reactor was cooled to Dry Ice temperature prior to filling with the starting materials.

Subsequently, about 50 parts by weight of polyethylene, having a molecular weight of approximately 300,000, were fed into the chilled reactor in the form of solid granules together with an excess, as based on the weight of the polymer, of 1,2-dichlorotetrafluoroethane. A steel ball of slightly smaller diameter than that of the reactor bore was seated on top of the polyethylene granular feed inside the reactor and the steel ball was surmounted by a disc of a low melting thermoplastic material to form a seal. A copper gasketed top cover for the reactor was subsequently screwed tightly into place. A short pressure outlet tube connected from the reactor interior through a pressure gauging instrument to a safety pop valve device completed the foam reactor assembly.

The sealed reactor and its contents were secured in a Wood's metal bath, the temperature of the bath being controlled by means of a thermostat to produce a melt of gasified polymer. The equilibrated reaction mixture was then heated to a temperature of 175° C. whereupon a multiple orifice extrusion die was secured to the bottom of the reactor by screwing the die into place whereby it covered the frangible disc previously described. The multiple orifice extrusion die was made of 5 mil brass tubing. It was constructed much like the screw-on top cover of the reactor with the lid of the cover being perforated with a multiplicity of evenly spaced holes. Each hole had been machined so as to measure 0.005 inch diameter. Subsequently, the temperature of the reaction mixture was maintained at 175° C. for a period of 16 hours. Thereafter, the reaction mixture was cooled to 150° C. and extrusion of the equilibrated polymer was accomplished by forcing the charge down through the tubular reactor by pumping through the top of the reactor a steady stream of glycerine delivered from a container outside of the reactor. Pumping of the glycerine into the reactor was accomplished by means of a No. 5 Zenith pump driven by a variable speed motor. The safety valve was set to relieve pressure at 900 p.s.i.g. and during the extrusion operation the valve was opened and the tube was filled with glycerine.

When the temperature of the equilibrated polymer reached 150° C. the Zenith pump was started and glycerine was forced into the reactor building up the pressure to 750 p.s.i.g. in from about 8 to 15 seconds to break the frangible disc. The gasified molten polyethylene then passed down through the multiple hole orifice and upon emerging from the orifice the gasified polyethylene filaments foamed instantaneously. The foamed polyethylene strands, thus, produced, were non-linear, and were about 0.025 inch in cross-sectional dimension. The foam had the desirable characteristics of a substantially uniform fine cell structure with a smooth continuous skin covering the major surface area of each foamed segment. The product had a bulk density of 0.34 pounds per cubic foot of the cellular mass.

*Example IV*

A charge of 25 grams of polypropylene having a molecular weight of 316,000 and 30 grams of dichlorotetrafluoroethane as foaming agent was sealed in a steel tube equipped with a frangible nickel disc as described in Example III. The polypropylene and the foaming agent were heated in the steel ampoule under pressure of the materials at a temperature of 175° C. for 8 hours. Thereafter, nitrogen was fed to the tube and sufficient pressure exerted to burst the nickel disc, thereby explosively extruding the materials into the atmosphere through a multiple discharge orifice having 10 outlet ports, each port having an inside diameter of 0.005 inch werein the polypropylene was expanded to a cellular mass. The product was a cellular body having a volume 27 times as great as the initial volume of the dense non-porous polypropylene and was composed of fine uniform cells. The product was soft and resilient.

*Example V*

To test the compressive strength and impact resistance of a mass of the non-linear, stranded polyolefin foam dunnage material of the invention, the following experiment was devised.

An eight ounce wide mouth glass bottle was partially filled to about three quarters its total capacity with lead shot and sealed by means of a metal screw top. The total weight of the shot weighted glass bottle was about 5 pounds. Next, a corrugated paper shipping carton having inside dimensions of 5¼ in. by 6⅝ in. by 10⅞ in. and having a volumetric capacity of about 379 cubic inches was employed to confine a mass of stranded polyethylene foam packing material of the invention around the glass bottle. In the bottom of the carton was arranged a two inch cusioning layer of polyethylene foam strands of Example III having the dimensions of about 0.08 inch cross-sectional diameter and having an average linear dimension of from about 8 to about 10 inches. The dunnage material was a mass of curled, bent, curved, intertangled polyethylene foam segments having a bulk density of about 0.34 pound per cubic foot. Subsequently, the shot weighted glass bottle was seated on the bottom cushioning mass of dunnage material and the remainder of the carton was filled with more of the non-linear polyethylene foam segments so as to provide a bumpering mass of the dunnage material on all sides of the glass bottle. The packing was completed with a sufficient amount of the new dunnage material to provide a snug, compact fit of the dunnage material surrounding the glass bottle and a sufficient amount to prevent any substantial movement of the bottle when the top flaps of the carton were finally folded and sealed with tape as is the customary means of enclosing the contents of a corrugated paper shipping carton.

The sealed carton was then repeatedly slid across a smooth surface at a rapid rate of speed to be stopped by a solid, stationary wall. Further, the carton was dropped several times and fell an average distance each time of from about 18 to about 24 inches.

Upon opening the tested carton, the shot-weighted glass bottle was observed to have restained substantially the same position in which it was packed and the weight of internal impact of the weighted glass bottle on the novel dunnage material had failed to crush, powder, break, or otherwise deform the individual segments of the resilient mass of curled, bent, curved, intertangled polyethylene foam strands to any extent which would generally permit possible damage to a heavy packaged article thusly handled in transit. In addition, the polyethylene foam strands were in a completely re-usable condition.

What is claimed is:

1. A dunnage material consisting essentially of a tangled interlocking mass of non-linear, elongated individual pieces of foamed polymer of at least one $\alpha$-monoolefinic aliphatic hydrocarbon containing from 2 to 8 carbon atoms; said pieces consisting of individual curled, bent, curved and twisted, elongated segments having a substantially continuous outer plastic skin formed integrally with and covering the interior cellular portions thereof; said interior portions being composed for the most part of individually-closed, thin-walled cells and each piece of the foam having a cross-sectional area equivalent to the area of a circle having a diameter of between about 0.04 and 1.0 inch with a ratio of length to cross-sectional area of at least 100:1 and a bulk density of from about 0.25 to 2.0 pounds per cubic foot of the tangled mass.

2. The dunnage material of claim 1, wherein said foamed $\alpha$-olefin-containing polymer is foamed polyethylene.

3. A packaging material capable of protecting from damage an article or object sensitive to shock, vibration, and impact, said material being employed as a tangled, interlocking mass which comprises individual, curled, bent, curved and twisted, non-linear elongated pieces of foamed polymer of at least one $\alpha$-monoolefinic aliphatic hydrocarbon containing from 2 to 8 carbon atoms composed of at least .75 percent by weight of at least one $\alpha$-monoolefinic aliphatic hydrocarbon containing from 2 to 8 carbon atoms, said pieces of foamed $\alpha$-olefin-containing polymer having a substantially continuous outer plastic skin integral with and covering the interior cellular portions thereof; said interior portions being composed for the most part of individually-closed, thin-walled cells and saids elongated foam pieces having a cross-sectional area equivalent to the area of a circle having diameter of between about 0.04 and 1.0 inch with a ratio of length to cross-sectional area of at least 100:1, an absolute density of between about 0.5 and 5.0 pounds per cubic foot and a bulk density of from about 0.25 to 2 pounds per cubic foot of the tangled mass.

4. A packaging material of claim 3, wherein said non-linear, elongated, individual pieces of foamed poly-$\alpha$-olefin-containing polymer are non-linear, elongated, individual pieces of foamed polyethylene.

References Cited by the Examiner

UNITED STATES PATENTS

| | | | |
|---|---|---|---|
| 2,928,130 | 3/1960 | Grey | 260—2.5 |
| 2,948,664 | 8/1960 | Rubens et al. | 260—2.5 |
| 3,017,371 | 1/1962 | Hohenberg | 260—2.5 |
| 3,065,190 | 11/1962 | Chrisholm et al. | 260—2.5 |
| 3,067,147 | 12/1962 | Rubens et al. | 260—2.5 |

MURRAY TILLMAN, *Primary Examiner.*

LEON J. BERCOVITZ, *Examiner.*

M. FOELAK, *Assistant Examiner.*